(12) United States Patent
Chang

(10) Patent No.: US 11,583,941 B2
(45) Date of Patent: Feb. 21, 2023

(54) ASSEMBLED CHAMFER MILL

(71) Applicant: Hsin-Tien Chang, Taichung (TW)

(72) Inventor: Hsin-Tien Chang, Taichung (TW)

( * ) Notice: Subject to any disclaimer, the term of this patent is extended or adjusted under 35 U.S.C. 154(b) by 0 days.

(21) Appl. No.: 17/352,768

(22) Filed: Jun. 21, 2021

(65) Prior Publication Data

US 2022/0168823 A1 Jun. 2, 2022

(30) Foreign Application Priority Data

Nov. 27, 2020 (TW) .................................. 109141871

(51) Int. Cl.
| | | |
|---|---|---|
| B23C 3/12 | (2006.01) | |
| B23C 5/02 | (2006.01) | |
| B23C 5/26 | (2006.01) | |

(52) U.S. Cl.
CPC ................. B23C 3/12 (2013.01); B23C 5/02 (2013.01); B23C 5/26 (2013.01); *B23C 3/126* (2013.01); *B23C 2220/16* (2013.01)

(58) Field of Classification Search
CPC ............ B23C 2210/02; B23C 2210/03; B23C 2210/242; B23C 2210/244; B23C 2220/16; B23C 2270/14; B23C 2270/16; B23C 3/12; B23C 5/02; B23C 5/26; B23C 5/109; B23B 31/005; B23B 31/11; B23B 31/1107; B23B 31/1122; B23B 2222/28; B23B 2222/84
See application file for complete search history.

(56) References Cited

U.S. PATENT DOCUMENTS

| | | | | |
|---|---|---|---|---|
| 1,620,536 | A * | 3/1927 | Emilgairing | .......... B23B 51/107 408/241 R |
| 2,282,596 | A * | 5/1942 | Wise | ..................... E21B 17/046 403/296 |
| 2,369,273 | A * | 2/1945 | Bakewell | ................. B23G 5/20 408/233 |
| 3,577,809 | A * | 5/1971 | Brandl | ...................... B23C 5/26 409/232 |
| 6,146,060 | A * | 11/2000 | Rydberg | ................... B23C 5/10 407/103 |
| 2008/0041495 | A1 | 2/2008 | Vondriska | |

(Continued)

FOREIGN PATENT DOCUMENTS

| | | |
|---|---|---|
| CN | 101658952 A | 3/2010 |
| CN | 203426516 U | 2/2014 |

(Continued)

OTHER PUBLICATIONS

Search Report Issued by International Patent Office for U.S. Appl. No. 21184221.6-1017 dated Jan. 5, 2022.

*Primary Examiner* — Nicole N Ramos
(74) *Attorney, Agent, or Firm* — Rosenberg, Klein & Lee

(57) ABSTRACT

An assembled chamfer mill comprises a tool holder, an extension shaft, and chamfer bits locked to two ends of the extension shaft. The chamfer bits each have upper blades and lower blades for chamfering the edges of a workpiece simultaneously. The length of a shaft body of the extension shaft may be set in various sizes. Depending on the thickness and shape of the workpiece, the shaft body having an appropriate length is selected, so as to control the distance between the two chamfer bits. Another extension shaft may be provided to connect a further chamber bit for chamfering the edges of the workpiece simultaneously.

7 Claims, 7 Drawing Sheets

(56) References Cited

U.S. PATENT DOCUMENTS

| | | |
|---|---|---|
| 2008/0170917 A1 | 7/2008 | Hilker |
| 2012/0039676 A1* | 2/2012 | Marshansky ......... B23C 5/1054 |
| | | 407/56 |
| 2013/0272807 A1 | 10/2013 | Luik et al. |
| 2015/0375309 A1* | 12/2015 | Burtscher ................ B23C 5/10 |
| | | 407/53 |
| 2018/0318941 A1* | 11/2018 | Chang .................... B23C 5/202 |
| 2019/0015909 A1 | 1/2019 | Kemmler et al. |
| 2020/0254545 A1 | 8/2020 | Ning et al. |
| 2021/0078086 A1* | 3/2021 | Ueno ....................... B23C 5/18 |

FOREIGN PATENT DOCUMENTS

| | | | |
|---|---|---|---|
| DE | 19745060 A1 | 4/1999 | |
| DE | 102006008887 A1 * | 8/2007 | ............ B23B 31/11 |
| DE | 102010054392 A1 | 6/2012 | |
| DE | 102011055210 A1 | 5/2013 | |
| EP | 1896207 A1 | 3/2008 | |
| EP | 3539701 A1 | 9/2019 | |
| JP | 2010214489 A | 9/2010 | |
| JP | 2017030091 A | 2/2017 | |
| KR | 100896119 B1 * | 5/2009 | |
| KR | 20100081391 A * | 7/2010 | |
| KR | 200468583 Y1 * | 8/2013 | |
| KR | 20140001306 U * | 3/2014 | |
| KR | 20160020886 A * | 2/2016 | |
| TW | I611852 B | 1/2018 | |
| WO | WO-2011089590 A2 * | 7/2011 | ........... B23B 27/007 |

* cited by examiner

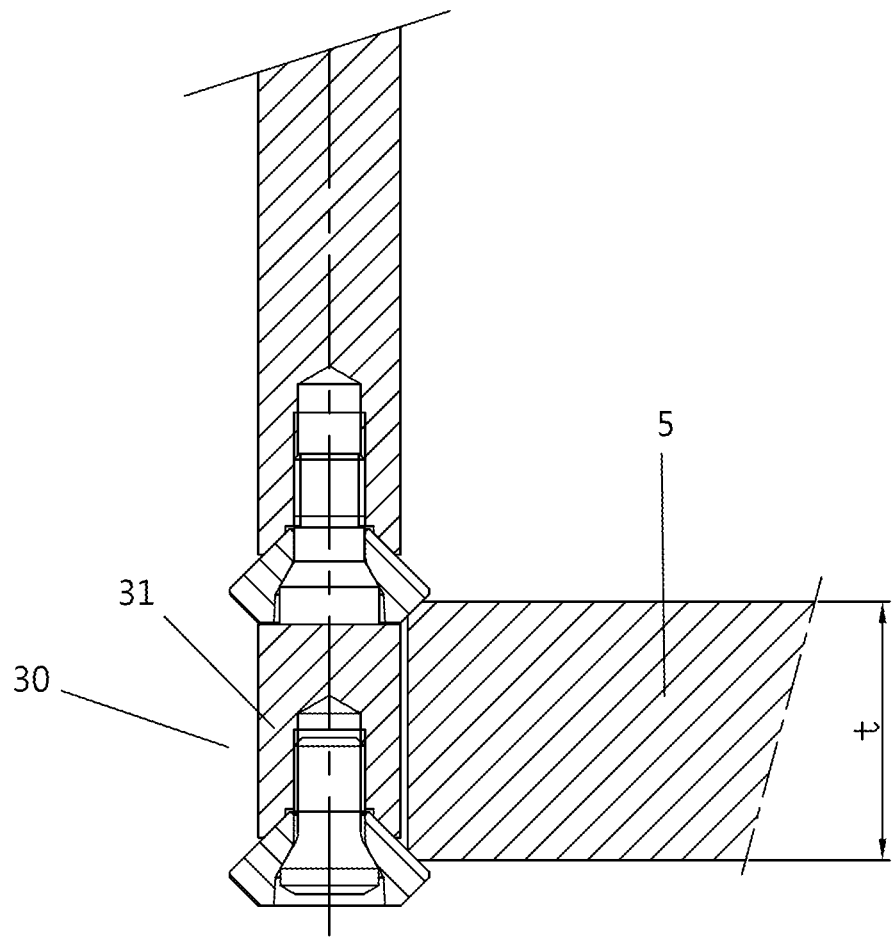
F I G . 3

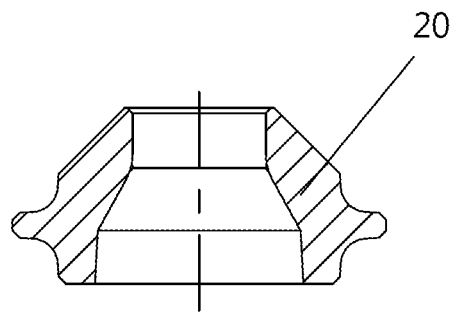
F I G . 7
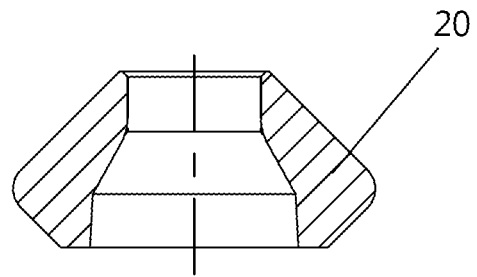
F I G . 8
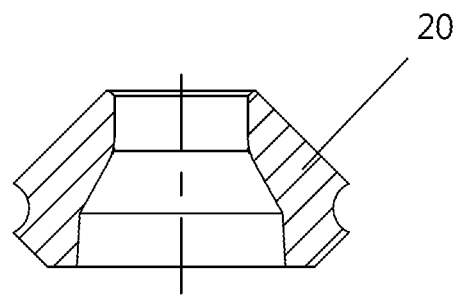
F I G . 9

ASSEMBLED CHAMFER MILL

BACKGROUND OF THE INVENTION

1. Technical Field

The present invention relates to a chamfer mill, and more particularly to an assembled chamfer mill provided with an extension shaft having an appropriate length according to the thickness of a workpiece, so as to adjust the distance between two chamfer bits connected to opposing two ends of the extension shaft. The assembled chamfer mill is especially suitable for simultaneously chamfering the edges of a workpiece in the form of a thin plate.

2. Description of Related Art

In general, after the surface of a workpiece is machined, the edges of the workpiece are chamfered or debarred successively to avoid sharp edges or burrs occurred to affect the assembly accuracy and size of the workpiece. A conventional chamfer mill generally uses a single chamber bit for directly cutting or milling a workpiece by 45 degrees or rounding the corners of the workpiece. However, for a thin workpiece, the workpiece is generally chamfered and debarred manually with a grinder.

Taiwan Patent Application No. 101215723 discloses a chamfer cutter, comprising a round blade disc, three blade holders and three blades. The blade holders each have a front taper portion. The front taper portion has an upper slope and a lower slope intersecting the upper slope. The blades each have a front taper cutting portion. The front taper cutting portion has an upper cutting slope and a lower cutting slope intersecting the upper cutting slope. The upper cutting slope and the lower cutting slope correspond to the upper slope and the lower slope, respectively. The chamfer cutter is used to cut the top and bottom edges of a workpiece to form upper and lower chamfers without turning the workpiece.

The above-mentioned chamfer cutter may include two chamfer cutters arranged one on top of another and connected to a rotating member. The distance between the blades of the two chamfer cutters is the thickness of a workpiece for chamfering the upper and lower edges of the workpiece simultaneously. But, its disadvantage is that the two chamfer cutters need to be arranged one on top of another. The thickness of the chamfer is also limited by the thickness of the chamfer cutters, being a fixed size. It is not suitable for chamfering the upper and lower edges of a thin workpiece or a workpiece with a changing thickness.

SUMMARY OF THE INVENTION

In view of the shortcomings of the prior art, the primary objective of the present invention is to provide an assembled chamfer mill.

The assembled chamfer mill of the present invention comprises a tool holder, a plurality of chamfer bits, at least one extension shaft, and a screw bolt. The chamfer bit is insertedly connected to one end of the tool holder. One end of the extension shaft is insertedly connected to the chamfer bit so that the extension shaft locks the chamfer bit to the tool holder. The other end of the extension shaft is connected with the other chamfer bit locked by the screw bolt. Thus, the two ends of the extension shaft are connected with at least two chamfer bits. The chamfer bit has upper blades and lower blades for chamfering the edges of a workpiece simultaneously.

The length of the shaft body of the extension shaft of the present invention may be set in various sizes. Depending on the thickness and shape of the workpiece, the extension shaft having an appropriate length is selected to control the distance between the two chamfer bits, or another extension shaft is provided to connect a further chamber bit for chamfering the edges of the workpiece simultaneously.

BRIEF DESCRIPTION OF THE DRAWINGS

FIG. 3 is a cross-sectional view of the assembled chamfer mill coupled with two chamfer bits for chamfering a thick workpiece according to an embodiment of the present invention;

FIG. 7 is a cross-sectional view of the chamfer bit of the assembled chamfer mill of the present invention, wherein the upper blade and the lower blade of the chamfer bit are concavely curved surfaces;

FIG. 8 is a cross-sectional view of the chamfer bit of the assembled chamfer mill of the present invention, wherein the upper blade the lower blade of the chamfer bit are sloping surfaces; and FIG. 9 is a cross-sectional view of the chamfer bit of the assembled chamfer mill of the present invention, wherein an arc-shaped groove is formed between the upper blade and the lower blade of the chamfer bit.

DETAILED DESCRIPTION OF THE INVENTION

Figure 1:
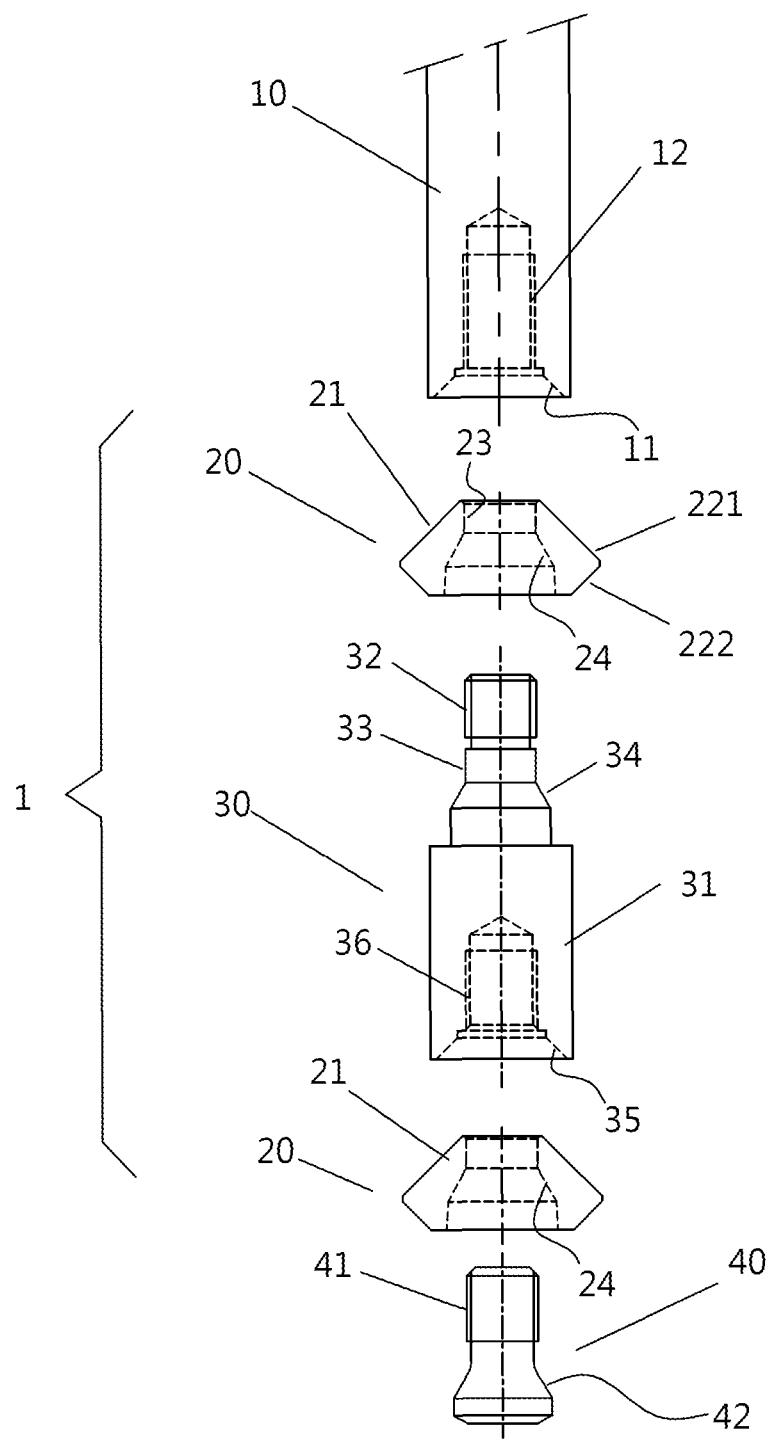
FIG. 1 is an exploded view of the assembled chamfer mill of the present invention.
Figure 2:
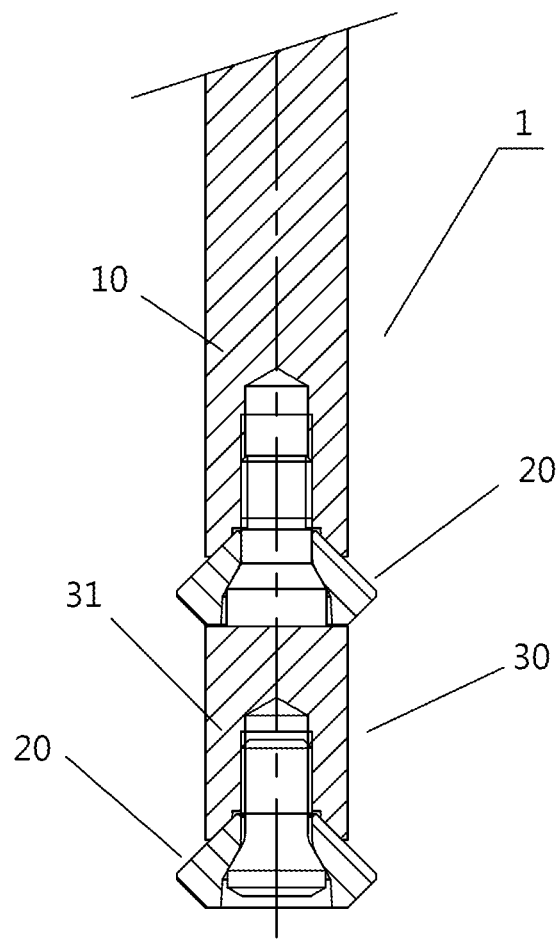
FIG. 2 is a cross-sectional view of the assembled chamfer mill of the present invention.

Referring to FIG. 1 and FIG. 2, an assembled chamfer mill 1 of the present invention comprises a tool holder 10, a plurality of chamfer bits 20, an extension shaft 30, and a screw bolt 40.

The tool holder 10 has its one end recessed with a tool holder inner taper hole 11 functioning as a joint surface and a tool holder inner screw hole 12 extending inwardly from the tool holder inner taper hole 11.

Figure 4:
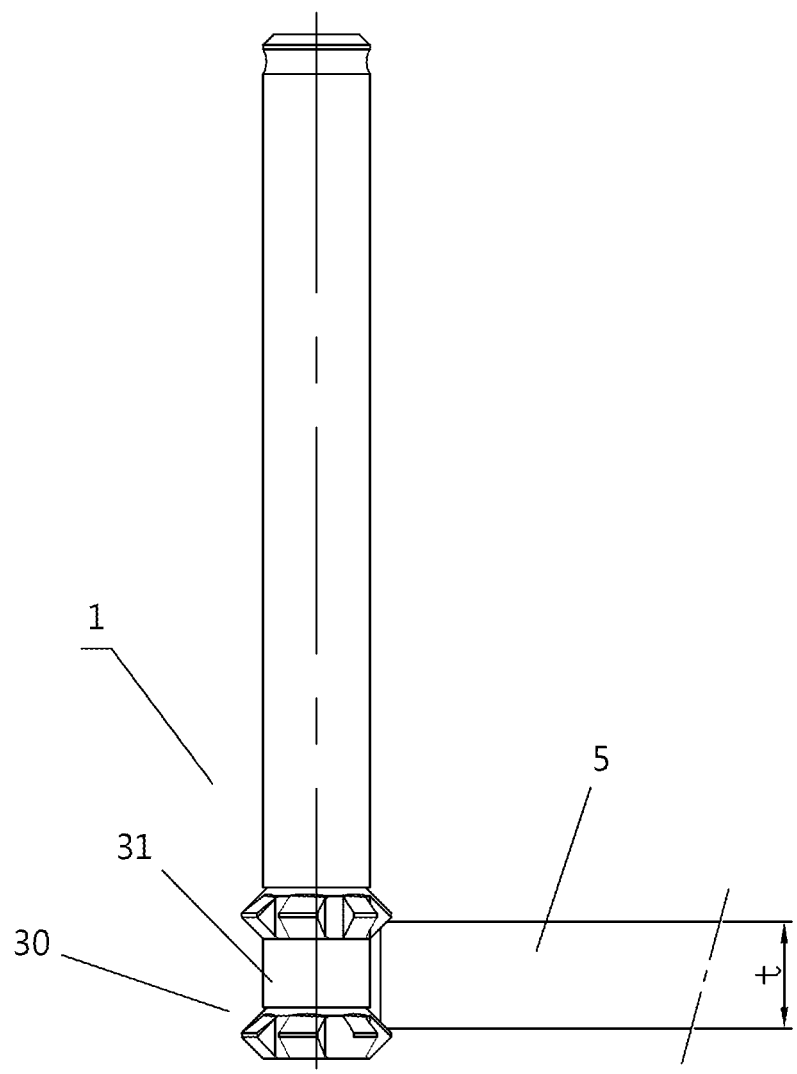
FIG. 4 is a schematic view of the assembled chamfer mill coupled with a short extension shaft and two chamfer bits for chamfering a thin workpiece according to an embodiment of the present invention.

The chamfer bits 20 are disposed at both ends of an extension shaft 30 and locked to the tool holder 10. Each chamfer bit 20 has opposing two ends formed with a cylindrical hole 23 and a chamfer bit inner taper hole 24 communicating with the cylindrical hole 23. One end of the chamfer bit 20 has a taper top 21. The taper top 21 and the cylindrical hole 23 are located at the same end of the chamfer bit 20. The taper top 21 functions as a joint surface. The taper top 21 is fitted with the tool holder inner taper hole 11, so that the cylindrical hole 23 and the chamfer bit inner taper hole 24 communicate with the tool holder inner taper hole 11 and the tool holder inner screw hole 12. A plurality of upper blades 221 and a plurality of lower blades 222 are arranged annularly on the periphery of the chamfer bit 20. The upper blades 221 and the lower blades 222 of the chamfer bit 20 are arranged at an equal angle (as shown in FIG. 4). The cylindrical hole 23 functions as a guide, and the chamfer bit inner taper hole 24 functions as a joint surface.

The extension shaft 30 includes a shaft body 31. The length of the shaft body 31 is set according to the thickness of a workpiece to be machined. One end of the shaft body 31 is sequentially extended with an extension shaft taper rod 34, a guide post 33 and a screw rod 32. The other end of the extension shaft 30 is recessed with an extension shaft inner taper hole 35 and an extension shaft inner screw hole 36 extending inwardly from the extension shaft inner taper hole 35. The extension shaft taper rod 34, the guide post 33 and the screw rod 32 of the extension shaft 30 are inserted into the chamfer bit inner taper hole 24 and the cylindrical hole 23, so that the screw rod 32 is locked into the tool holder inner screw hole 12 of the tool holder 10, the guide post 33 is fitted with the cylindrical hole 23 of the chamfer bit 20, and the extension shaft taper rod 34 is fitted with the chamfer bit inner taper hole 24. The other chamfer bit 20 is connected to the extension shaft 30, so that the taper top 21 of the other chamfer bit 20 is fitted with the extension shaft inner taper hole 35, and the cylindrical hole 23 and the chamfer bit inner taper hole 24 of the other chamfer bit 20 communicate with the extension shaft inner taper hole 35 and the extension shaft inner screw hole 36.

The screw bolt 40 has opposing two ends provided with a screw thread 41 and a screw bolt taper rod 42. The screw bolt 40 is inserted into the chamfer bit inner taper hole 24 and the cylindrical hole 23 of the other chamfer bit 20, so that the screw thread 41 is engaged with the extension shaft inner screw hole 36, and the screw bolt taper rod 42 is fitted with the extension shaft inner taper hole 35, thereby being correspondingly fitted with the chamfer bit inner taper hole 24 of the other chamfer bit 20. Thus, the other chamfer bit 20 is locked to the extension shaft 30.

As shown in FIG. 2, the tool holder 10 of the present invention is connected with two chamfer bits 20 in series, and the two chamfer bits 20 are separated by the extension shaft 30. The shaft body 31 of the extension shaft 30 is configured to control the distance between the two chamfer bits 20 to match the thickness of the workpiece to be machined. As shown in the embodiment of FIG. 3, the shaft body 31 having an appropriate length of the extension shaft 30 is selected for use, in cooperation with the thickness t of the workpiece 5. As shown in FIG. 4, if the workpiece 5 has a small thickness t, the extension shaft 30 having a shorter length of the shaft body 31 is selected for assembly, so as to form an assembled chamfer mill 1 with a shorter interval for chamfering operations.

Figure 5:
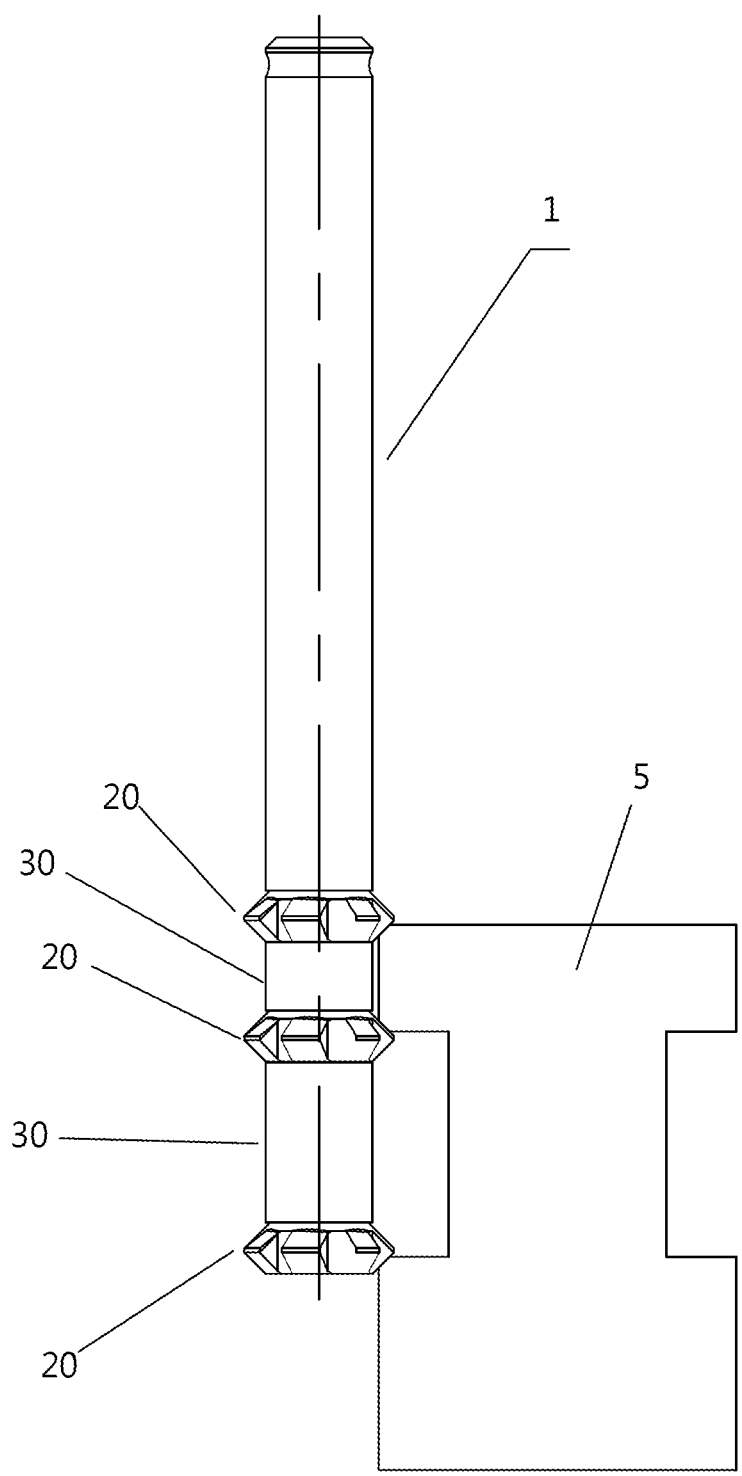
FIG. 5 is a schematic view of the assembled chamfer mill coupled with three chamfer bits for chamfering a workpiece according to an embodiment of the present invention.

As shown in FIG. 5, the number of chamfer bits 20 of the assembled chamfer mill 1 of the present invention can be appropriately adjusted according to the diversity of the workpiece 5 to be machined. The workpiece 5 in an I-like shape, as shown in FIG. 5, has three edges to be chamfered. The present invention may be assembled with three chamfer bits 20 and two extension shafts 30 having an appropriate length, so that three edges of the workpiece 5 can be chamfered at one time.

Figure 6:
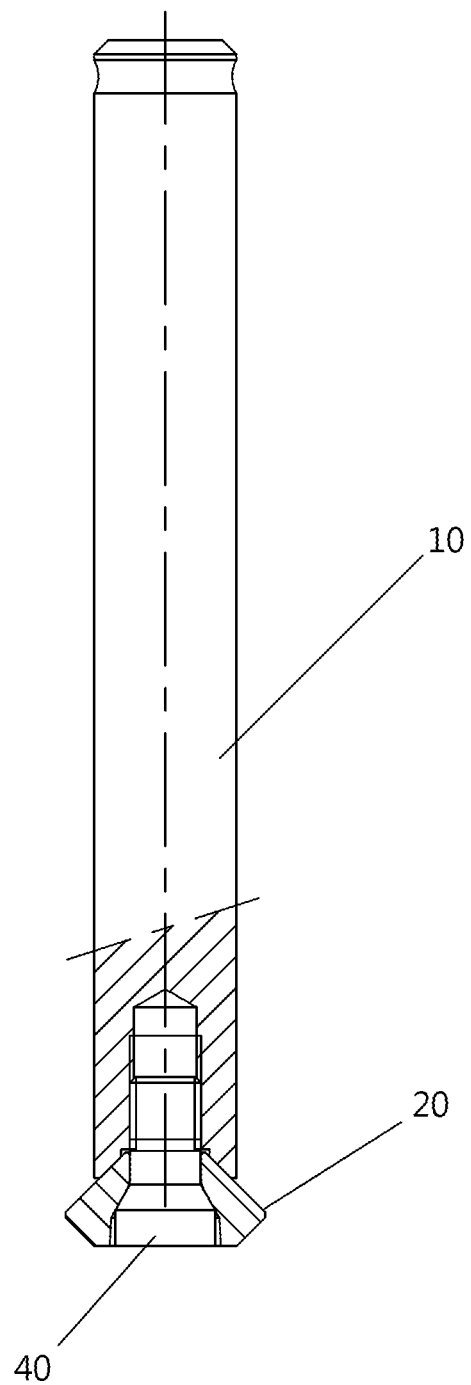
FIG. 6 is a schematic view of the assembled chamfer mill coupled with a single chamfer bit according to an embodiment of the present invention.

In addition to this arrangement that the tool holder 10 of the present invention is in cooperation with plural chamfer bits 20 through the extension shaft 30 for chamfering, as shown in FIG. 6, the tool holder 10 may be in cooperation with a single chamfer bit 20 locked by the screw bolt 40 to form the chamber mill for performing the chamfering operation of a single edge.

Please refer to FIG. 1 and FIGS. 7-9. In the chamfer bit 20 of the assembled chamfer mill of the present invention, the upper blades 221 of the chamfer bit 20 are connected to the taper top 21. The upper blades 221 and the lower blades 222 of the chamfer bit 20 are gradually reduced outwardly. As shown in FIG. 7, the upper blades 221 and the lower blades 222 of the chamfer bit 20 are concavely curved surfaces. As shown in FIG. 8, the upper blades 221 and the lower blades 222 of the chamfer bit 20 are sloping surfaces. As shown in FIG. 9, an arc-shaped groove is formed between each of the upper blades 221 and a corresponding one of the lower blades 222 of the chamfer bit 20.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An assembled chamfer mill, configured to chamfer a workpiece, comprising:
   a tool holder, having an end formed with a tool holder inner taper hole and a tool holder inner screw hole extending inwardly from the tool holder inner taper hole;
   a chamfer bit having opposing first and second ends, the first end having a cylindrical hole formed therein and the second end having a chamfer bit inner taper hole formed therein and in open communication with the cylindrical hole of the first end, the chamfer bit having a taper top adjacent the first end and a plurality of radially extending upper and lower blades disposed in angular spaced relationship, the chamfer bit being connected to the tool holder, the taper top being fitted with the tool holder inner taper hole, the cylindrical hole and the chamfer bit inner taper hole being in open communication with the tool holder inner taper hole and the tool holder inner screw hole;
   at least one extension shaft including a shaft body, the shaft body having a length selected to be in correspondence to a thickness of the workpiece, a first end of the shaft body being sequentially formed with an extension shaft taper rod, a guide post, and a screw rod extending therefrom, and a second opposing end of the extension shaft being formed with an extension shaft inner taper hole and an extension shaft inner screw hole extending inwardly from the extension shaft inner taper hole;
   at least one second chamfer bit having opposing first and second ends, the first end thereof having a cylindrical hole formed therein and the second end thereof having a chamfer bit inner taper hole formed therein and in open communication with the cylindrical hole of the first end thereof, the at least one second chamfer bit having a taper top adjacent the first end thereof;
   a screw bolt having a screw bolt taper rod at one end thereof and a screw thread extending therefrom, the screw bolt being inserted into the chamfer bit inner taper hole and the cylindrical hole of one of, the chamfer bit or the at least one second chamfer bit, and the screw thread thereby being correspondingly engaged with one of the tool holder inner screw hole of the tool holder or the extension shaft inner screw hole, and the screw bolt taper rod is thereby fitted with the chamfer bit inner taper hole of one of, the chamfer bit or the at least one second chamfer bit, thereby locking a corresponding one of the chamfer bit or the at least one second chamfer bit;
   wherein the extension shaft taper rod, the guide post, and the screw rod of the at least one extension shaft are inserted into the chamfer bit inner taper hole and the cylindrical hole of the chamfer bit to engage the tool holder inner screw hole, the screw rod thereby being locked into the tool holder inner screw hole, the guide post thereby being fitted with the cylindrical hole of the chamfer bit, and the extension shaft taper rod thereby being inserted into the chamfer bit inner taper hole of the chamfer bit; the at least one second chamfer bit is connected to the at least one extension shaft, the taper top of the at least one second chamfer bit is inserted into the extension shaft inner taper hole, and the cylindrical hole and the chamfer bit inner taper hole of the at least one second chamfer bit are in open communication with the extension shaft inner taper hole and the extension shaft inner screw hole of the at least one extension shaft, and the screw bolt is inserted into the chamfer bit inner taper hole and the cylindrical hole of the at least one second chamfer bit, the screw thread is engaged with the extension shaft inner screw hole of the at least one extension shaft, and the screw bolt taper rod is thereby seated in the chamfer bit inner taper hole of the at least one second chamfer bit, and the at least one second chamfer bit thereby being locked to the at least one extension shaft.

2. The assembled chamfer mill as claimed in claim 1, wherein the at least one extension shaft is plural with different lengths.

3. The assembled chamfer mill as claimed in claim 1, wherein another at least one extension shaft and another second chamfer bit are sequentially assembled with respect to the tool holder, and the another at least one extension shaft and the another at least one second chamfer bit are subsequently locked by the screw bolt.

4. The assembled chamfer mill as claimed in claim 1, wherein respective upper blades of the chamfer bit and the at least one second chamfer bit are respectively connected to the taper top of a corresponding one of the chamfer bit and at least one second chamfer bit.

5. The assembled chamfer mill as claimed in claim 1, wherein respective portions of surfaces of the upper blades and the lower blades of the chamfer bit and of the at least one second chamfer bit are formed with one of a sloping contour or a concavely-curved contour.

6. The assembled chamfer mill as claimed in claim 5, wherein the upper blades and the lower blades of the chamfer bit and of the at least one second chamfer bit are arranged in either one of a same configuration or a different configuration with respect to one another.

7. The assembled chamfer mill as claimed in claim 5, wherein an arc-shaped groove is formed between each of the upper blades and a corresponding one of the lower blades of the chamfer bit and of the at least one second chamfer bit.

* * * * *